(12) United States Patent
Aizawa et al.

(10) Patent No.: US 7,748,521 B2
(45) Date of Patent: Jul. 6, 2010

(54) CONVEYOR-BELT WEAR DETECTOR

(75) Inventors: Satoshi Aizawa, Higashi-Yamato (JP);
Kenichi Higashi, Kamakura (JP);
Yukinobu Nishikita, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/911,622

(22) PCT Filed: Apr. 12, 2006

(86) PCT No.: PCT/JP2006/307728
§ 371 (c)(1),
(2), (4) Date: Nov. 7, 2008

(87) PCT Pub. No.: WO2006/112318
PCT Pub. Date: Oct. 26, 2006

(65) Prior Publication Data
US 2009/0145730 A1 Jun. 11, 2009

(30) Foreign Application Priority Data

Apr. 13, 2005 (JP) ............................ 2005-115626
Oct. 21, 2005 (JP) ............................ 2005-306603

(51) Int. Cl.
*G01B 7/00* (2006.01)
(52) U.S. Cl. ............................ 198/810.03; 198/810.02; 198/810.04; 340/676
(58) Field of Classification Search ............ 198/810.02, 198/810.03; 340/676
See application file for complete search history.

(56) References Cited

U.S. PATENT DOCUMENTS 3,750,129 A   7/1973   Takeno et al.
4,020,945 A   5/1977   Takeno et al.
4,437,563 A * 3/1984   Oriol ..................... 198/810.02
4,653,633 A * 3/1987   Jacobs ................... 198/810.02
4,854,446 A * 8/1989   Strader .................. 198/810.02
5,168,266 A * 12/1992  Fukuda ....................... 340/676
5,705,861 A * 1/1998   Esguerra ...................... 307/106
6,047,814 A * 4/2000   Alles et al. ............. 198/810.02
6,127,822 A * 10/2000  Sasahara et al. ............. 324/209
6,264,577 B1 * 7/2001  Hutchins .................... 474/106
6,356,201 B1   3/2002   Alles
6,715,602 B1 * 4/2004   Gartland ................ 198/810.02

(Continued)

FOREIGN PATENT DOCUMENTS

DE        195 25 326 C1     10/1996

(Continued)

OTHER PUBLICATIONS

Supplementary European Search Report dated Mar. 13, 2009.

*Primary Examiner*—Douglas A Hess
(74) *Attorney, Agent, or Firm*—Sughrue Mion, PLLC

(57) ABSTRACT

A conveyer belt abrasion detecting apparatus which can automatically detect a conveyer belt abrasion quantity easily and accurately during operation. A plurality of magnet sheets (M1-M5) magnetized in a thickness direction are arranged so that polarities on the surface are in the same direction and are embedded deeper stepwise in a longitudinal direction of a belt main body (2). A magnetic sensor (4) for detecting changes of the magnetic forces of the magnet sheets (M1-M5) is arranged at a position where the magnet sheets (M1-M5) pass through.

6 Claims, 7 Drawing Sheets

U.S. PATENT DOCUMENTS

| | | | |
|---|---|---|---|
| 6,781,515 B2 * | 8/2004 | Kuzik et al. | 340/676 |
| 7,132,943 B2 * | 11/2006 | Nelson | 340/551 |
| 7,222,727 B2 * | 5/2007 | Aisenbrey | 198/810.04 |
| 7,347,317 B2 * | 3/2008 | Aizawa et al. | 198/810.02 |

FOREIGN PATENT DOCUMENTS

| | | |
|---|---|---|
| DE | 19525326 C1 | 10/1996 |
| JP | 6-48528 A | 2/1994 |
| JP | 2004-35115 A | 2/2004 |
| WO | 2005/005292 A1 | 1/2005 |
| WO | 2005005292 A1 | 1/2005 |

* cited by examiner (a)

(b)

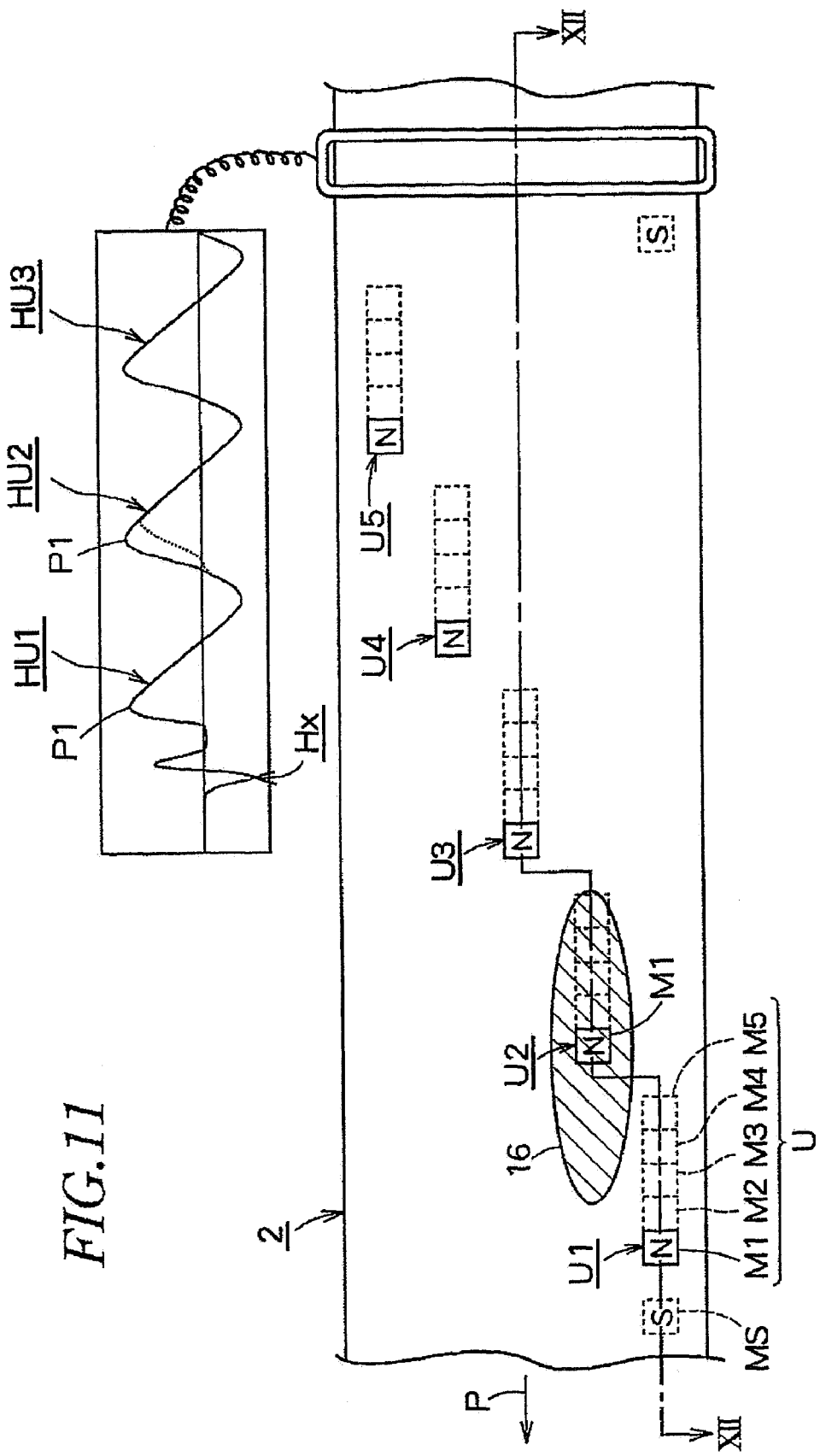

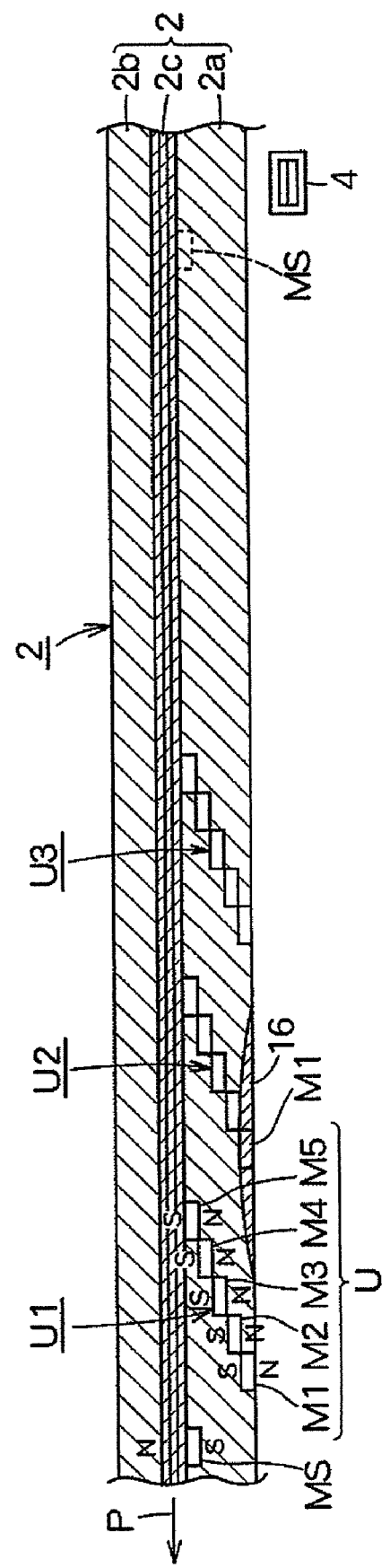

CONVEYOR-BELT WEAR DETECTOR

CROSS REFERENCE TO RELATED APPLICATIONS

This application is a National Stage of International Application No. PCT/JP2006/307728 filed on Apr. 12, 2006, claiming priority based on Japanese Patent Application Nos. 2005-115626, filed Apr. 13, 2005 and 2005-306603, filed Oct. 21, 2005, the contents of all of which are incorporated herein by reference in their entirely.

TECHNICAL FIELD

The present invention relates to a conveyor-belt wear detector for detecting wear of a conveyor belt without contact.

BACKGROUND OF THE INVENTION

JP2004-35115A discloses a conveyor-belt wear detector in which a wear-detecting layer having a color different from that of an elastic layer of a belt body is embedded in a belt body, the colored wear-detecting layer being exposed with wear of the elastic layer to allow the wear to be found.

As another measure for detecting wear, thickness of a conveyor belt is periodically determined by an ultrasonic-wave thickness meter to find wear while the conveyor belt stops.

In DE19525326C1 a number of transponders are embedded at different depths from the surface in a belt. Destruction or dropout of any one of the transponders with wear of the belt is detected by an antenna comprising a transmission coil and a sensor coil to allow wear of the belt to be found.

However, in the detector of JP2004-35115A and the ultrasonic wave thickness meter, it is very difficult to determine the amount of the wear automatically. Wear has to be determined visually by a person while the conveyor belt stops, so that its efficiency is poor.

In DE19525326C1, a number of transponders have to be embedded over a broad range to make the device itself larger, which requires a high cost.

SUMMARY OF THE INVENTION

It is an object of the invention to provide a conveyor-belt wear detector for detecting wear of a conveyor belt during operation automatically, readily and exactly.

BRIEF DESCRIPTION OF THE DRAWINGS

FIG. 11 is a bottom plan view showing the fourth embodiment of the present invention, similar to FIG. 3; and FIG. 12 is a sectional view taken along the line XII-XII in FIG. 11.

DETAILED DESCRIPTION OF PREFERRED EMBODIMENTS

The first embodiment of a conveyor-belt wear detector comprises a magnet-sheet group 3 comprising a plurality of magnet sheets M1,M2,M3,M4,M5 in a belt body 2 wound on a pulley 1; and a magnetic sensor 4 for detecting magnetic force from the magnet sheet group 3 near the belt body 2.

Figure 2:
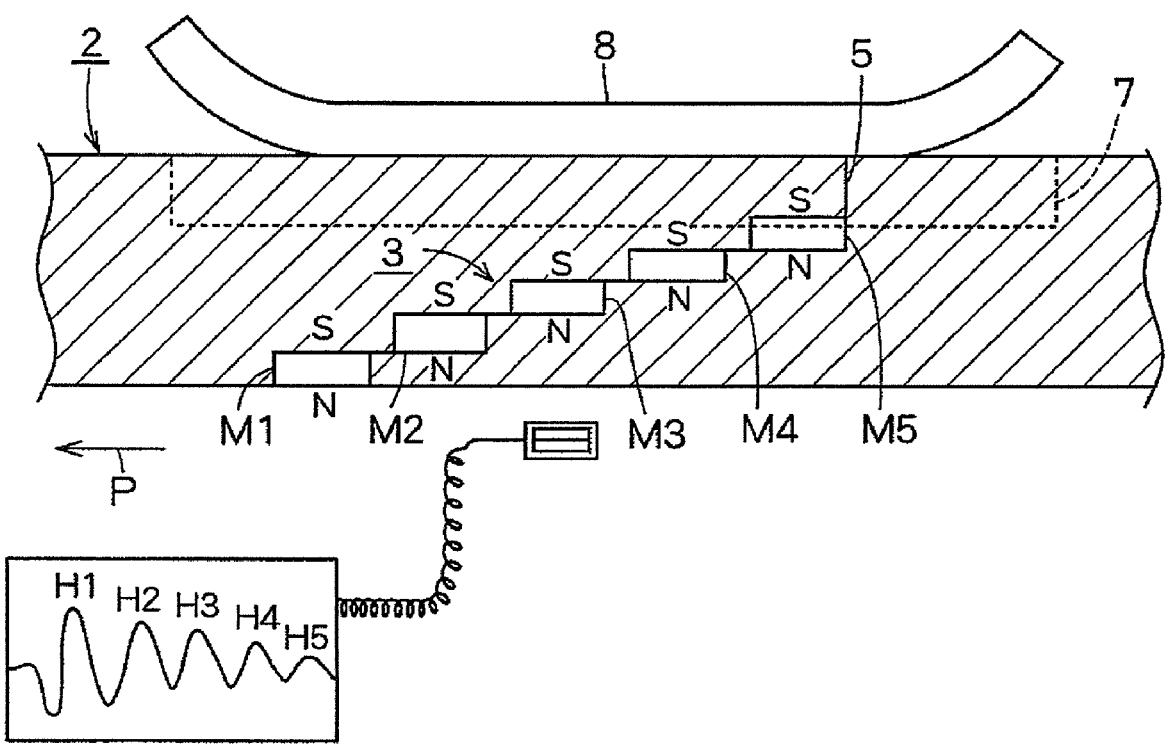
FIG. 2 is an enlarged sectional view of the part II in FIG. 1.

In each of the magnetic sheets M1-M5 of the magnet sheet group 3, a sheet-like magnetic substance is magnetized along thickness of the belt body 2 or vertically in FIG. 2, and magnet powder is dispersed and mixed in a rubber matrix, which is molded like a sheet and magnetized along thickness of the belt body 2 to form a bonded magnet. Other permanent magnets may be used.

Along a running direction P of the belt body 2, the magnet sheet are embedded to become deeper, but may be embedded shallower. The number of the magnet sheets M1-M5 may be more than one.

The magnet sheets M1 to M5 can be embedded in the belt body 2 when a belt is manufactured, but may preferably be embedded in a joined portion 5 at which one end of the belt body 2 is joined to the other end because it is easier to embed it. Where to embed it is not limited thereto.

In the illustrated embodiment, in any of the magnet sheets M1-M5, N poles are in an outer side, while S-poles are in an inner side, but N-poles may be in an inner side, while S-poles may be in an outer side.

Figure 1:
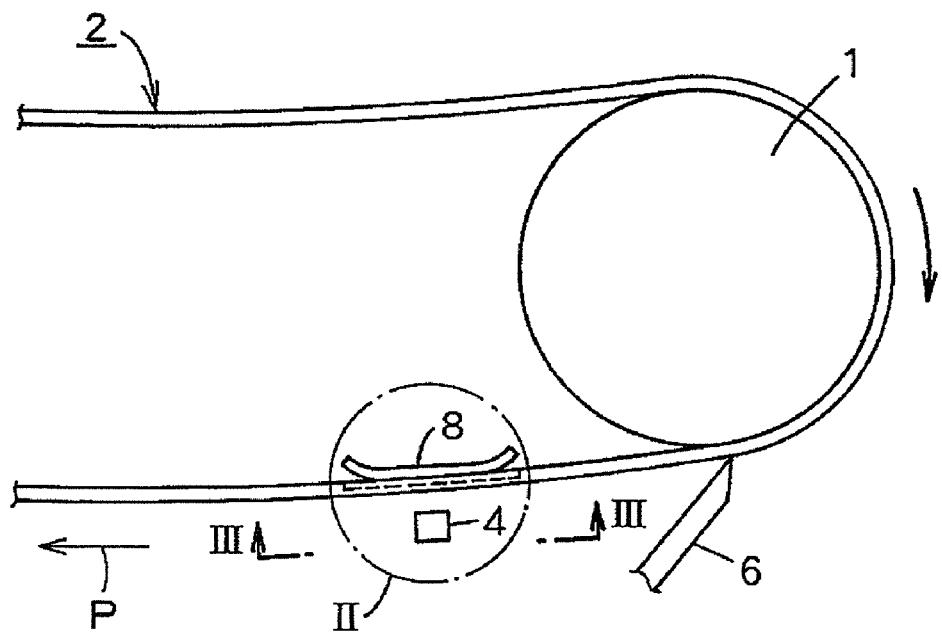
FIG. 1 is a side elevational view of the first embodiment of a conveyor-belt wear detector according to the present invention.

The magnetic sensor 4 is well-known such as a loop coil or a hole element and located as close as possible with respect to a running position of the magnet sheets M1-M5. In FIGS. 1 and 2, the magnetic sensor 4 may preferably be positioned near the returning belt body 2. Cleaned part which conveyed material is taken off by a scraper 6 can be detected in the belt body 1.

Figure 3:
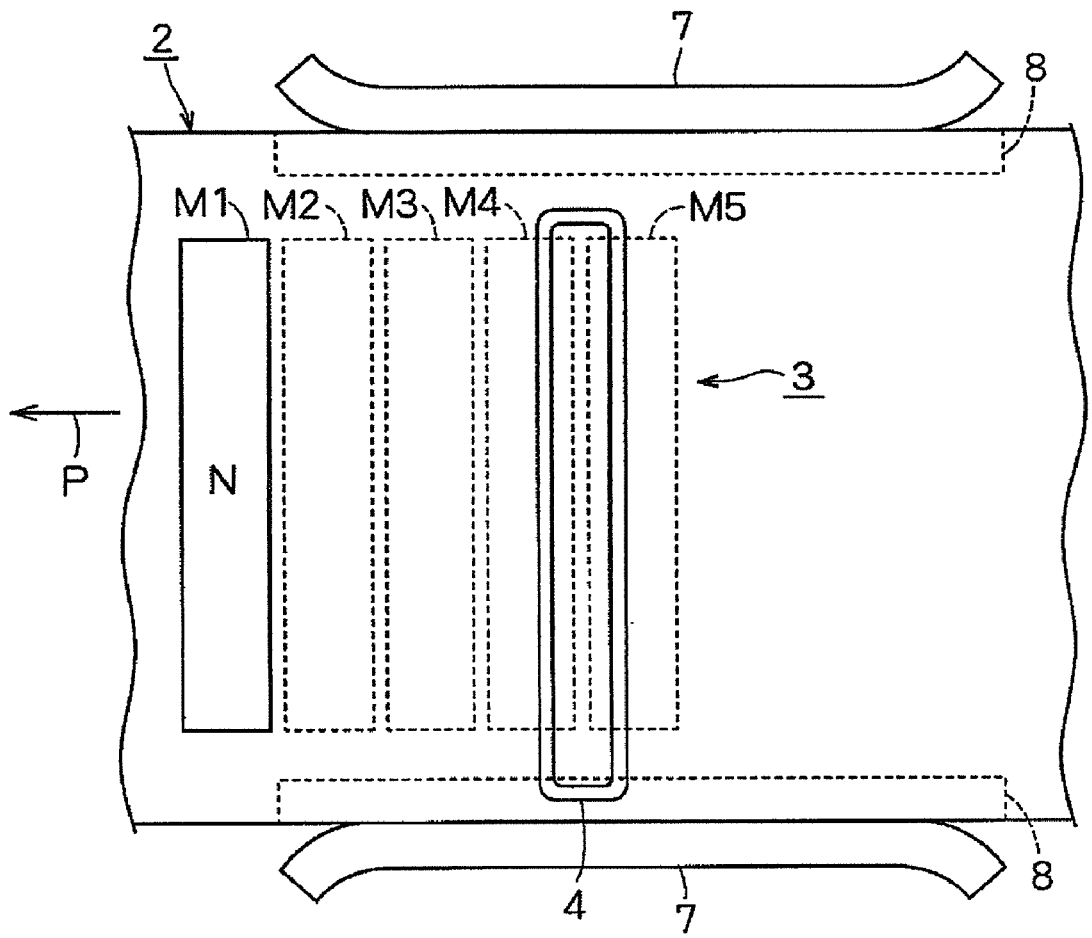
FIG. 3 is an enlarged view seen from the line III-III in FIG. 1.

In FIG. 3, a width guide 7 is provided to limit a width of the belt body 2 passing through the guide 7, while a thickness guide 8 is provided to keep a relation of the belt body 2 with the magnetic sensor 4 at the other side of the magnetic sensor 4. The magnetic sheets M1-M5 having the same length are embedded in the belt body 2 along width of the belt body 2.

Figure 4:
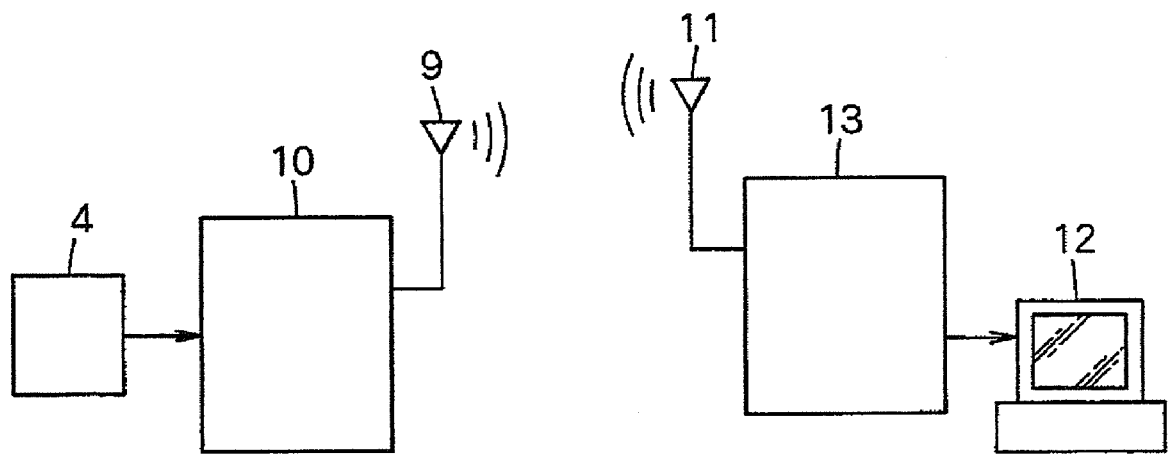
FIG. 4 is a block diagram of a control.

FIG. 4 shows one example of a conveyor-belt wear detector. A control comprises a site control portion 10 which receives a detected signal from the magnetic sensor 4, operates wearing degree of the belt and transmits the result from a transmitting portion 9; and a central control portion 13 in which a receiving portion 11 receives a transmitted signal, outputs an operated result to an output terminal 12 and taking required actions such as giving a warning or stopping the belt conveyor if the wear exceeds a critical value.

The site control portion 10 or the central control portion 13 comprises a digital control unit (not shown) which counts a peak number of magnetic force of the magnet sheets M1-M5 detected by the magnet sensor 4, finds dropout of the magnet sheets M1-M5 owing to decrease in the counted number and detects wear of the belt body 2 digitally; and an analogue control unit (not shown) which detects wear of the belt body 2 analoguely based on change in peak values of magnetic force of the magnetic sheets M1-M5 detected by the magnetic sensor 4.

Operation of the embodiment of a wear detector will be described.

Whenever the magnet sheets M1-M5 pass near the magnet sensor 4 as the belt body 2 moves in a direction of an arrow P, the magnet sensor 4 detects magnetic force and a signal of wave form in FIG. 2 is outputted. A signal from the nearest magnet sheet M1 is an output wave form H1 having the highest peak value and a signal of the second stage magnet sheet M2 is slightly lower peak value. Signals of the magnet sheets M3,M4 are output waveforms H3,H4 of lower peak values. A signal from the deepest magnet sheet M5 is an output waveform H5 of the lowest peak value.

Figure 5:
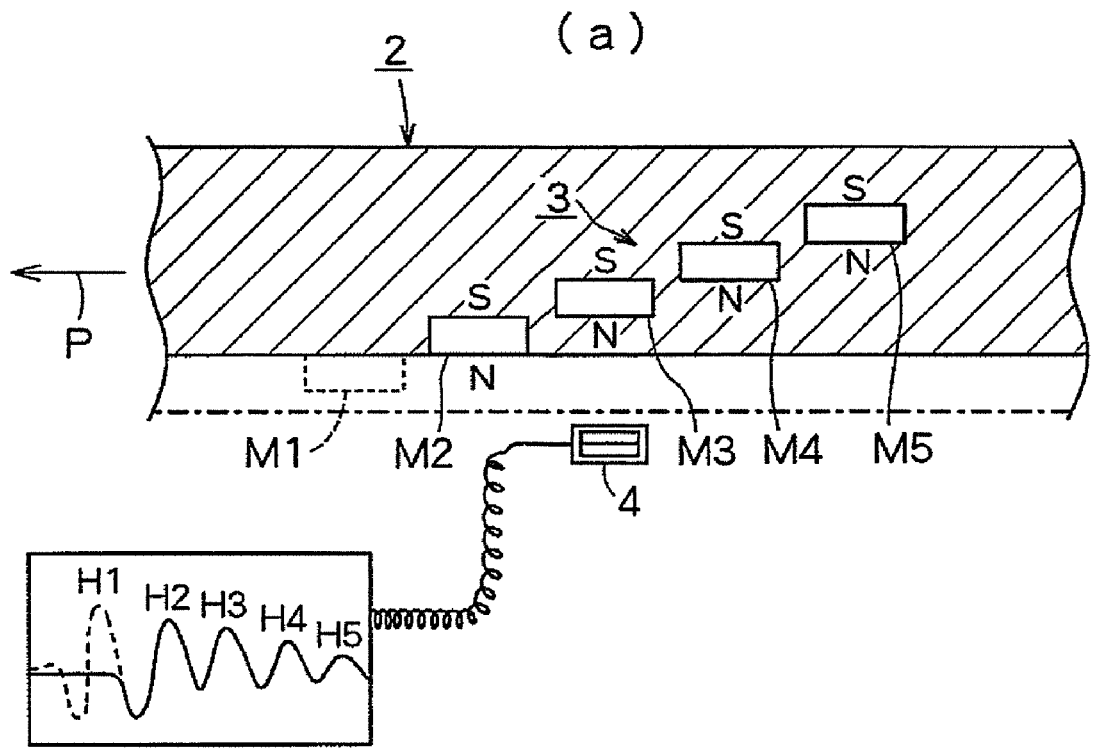
FIG. 5 is a sectional view showing wear of a belt.
Figure 5:
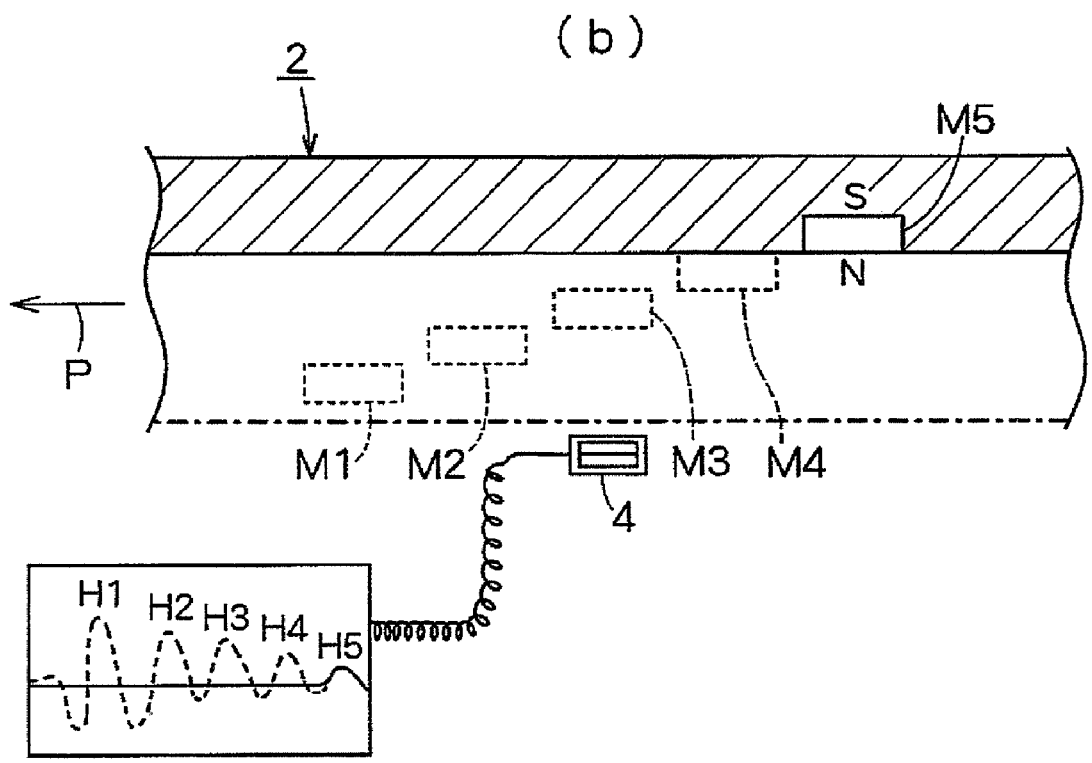

FIG. 5 shows wear of the conveyor belt. Wear of the belt body 2 starts from the face on which material is conveyed, and the first magnet sheet M1 which is the shallowest starts to wear. In FIG. 5(a), the first magnet sheet M1 drops out with wear of the belt body 2, so the output waveform H1 disappears.

Furthermore, the second, third and fourth magnet sheets M2, M3, M4 drop out, so that the output waveforms H1-H4 disappear and the output waveform H5 from the magnet sheet M5 only remains.

A signal from the magnetic sensor 4 is inputted into the site control portion 10, and the number of peak values of the output waveforms H1-H5 is counted by a counter therein and determines the magnet sheets M1-M5 dropped out, so that wear of the belt body 2 can exactly be detected digitally.

The peak values of the present output waveforms H1-H5 are deducted from the peak values of the initial output waveforms H1-H5 of the belt body 2, so that wear degree is detected analoguely until each of the magnet sheets M1-M5 drops out.

Figure 6:
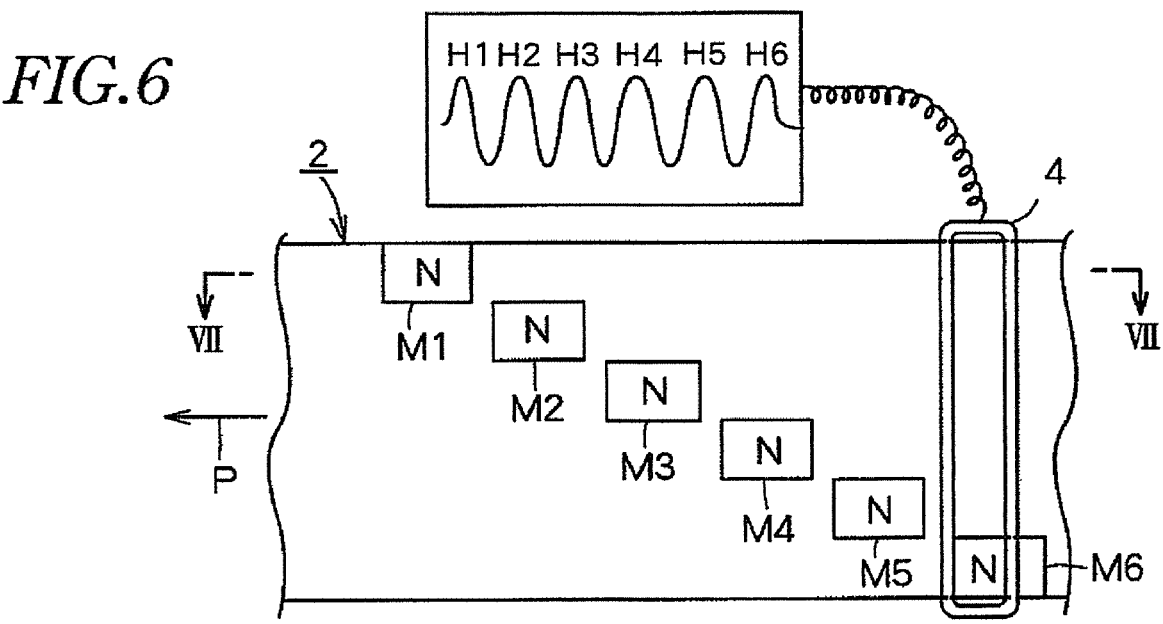
FIG. 6 shows the second embodiment of the present invention, similar to FIG. 3.
Figure 7:
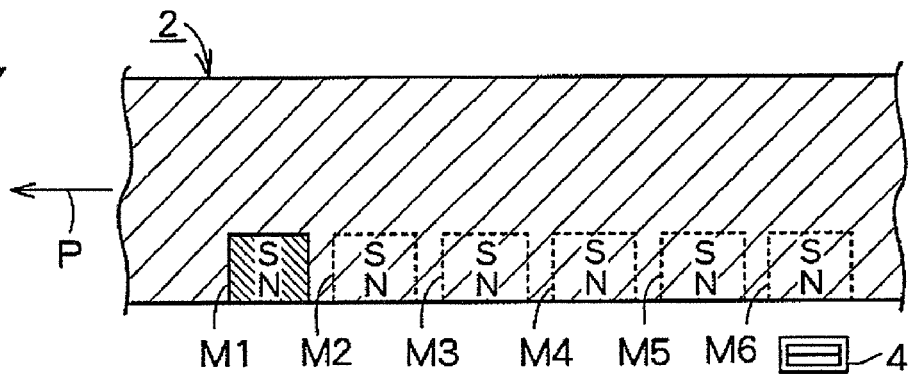
FIG. 7 is a sectional view taken along the line VII-VII in FIG. 6.
Figure 8:
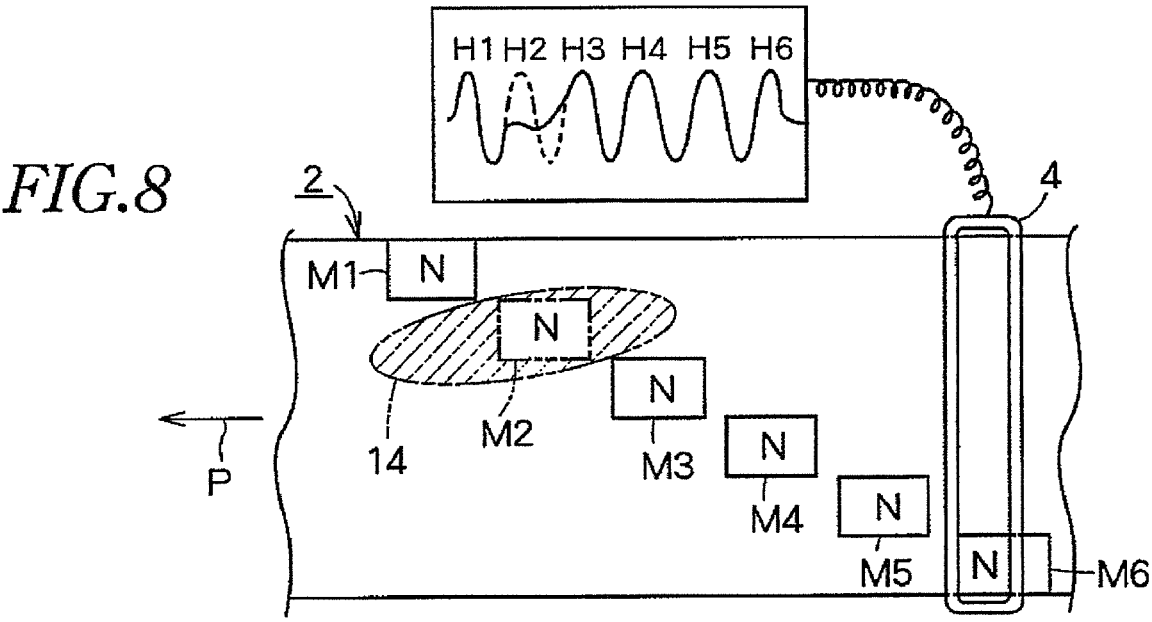
FIG. 8 is a view showing local wear of a belt body in the second embodiment.

FIGS. 6-8 show the second embodiment of the invention.

Each of magnet sheets M1-M6 of a magnet sheet group 3 is magnetized along thickness of the belt body 2 similar to the first embodiment. In the second embodiment, each of the magnet sheets M1-M6 in the magnet sheet group 3 is embedded at the same depth from the face of the belt body 2 having the same direction of magnetic pole, shifting along width and length to form an oblique arrangement.

The magnetic sensor 4 comprises a gate-shape loop coil which can cover the whole width of the belt body 2, close to the surface of the belt body 2.

Whenever the belt body 2 moves in a direction of an arrow P to allow the magnet sheets M1-M6 to pass close to the magnetic sensor 4, the magnetic sensor 4 detects the magnetic force and signals of output waveforms H1-H6 having substantially the same peak values 4 are outputted from the magnetic sensor 4 in FIG. 6.

In FIG. 8, local wear 14 occurs in the belt body 2, and the second magnet sheet M2 drops out, so that the second output waveform H4 disappears, which is detected by a site control portion 10 to find out a position of the wear similar to the first embodiment.

Peak value of each of the output waveforms H1-H6 is deducted from peak value of the initial output waveforms H1-H6 of the belt body 2, thereby analoguely detecting wear until each of the magnet sheets M1-M6 drops out or wear of the belt body 2 where each of the magnet sheets M1-M6 is disposed.

Figure 9:
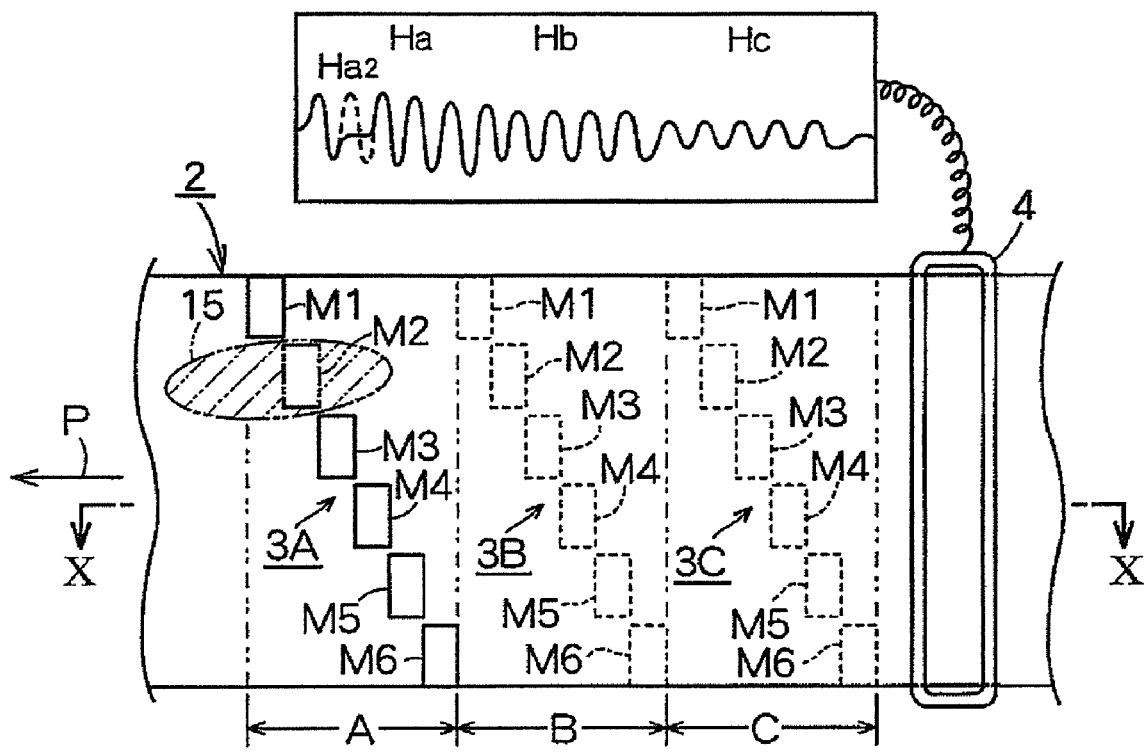
FIG. 9 is a bottom plan view of the third embodiment of the present invention, similar to FIG. 3.
Figure 10:
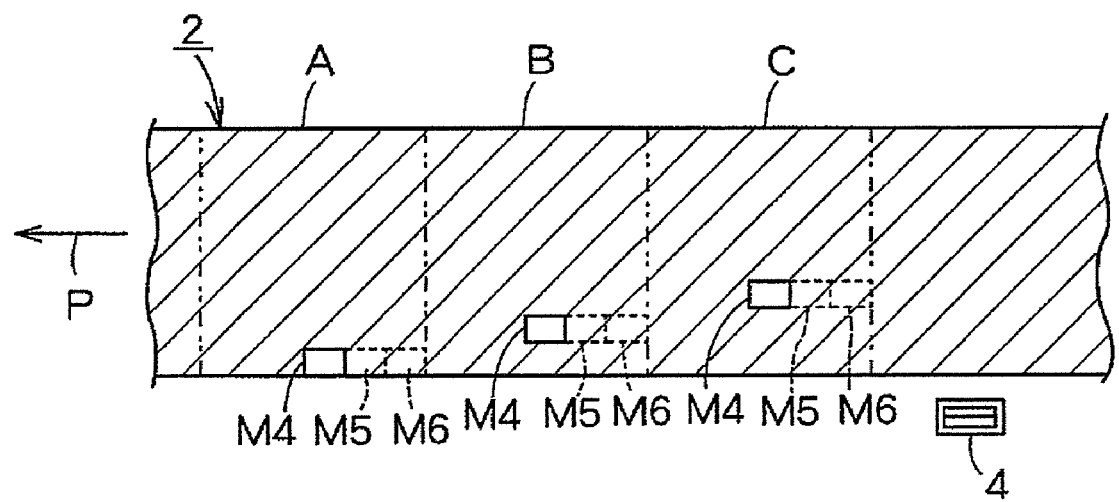
FIG. 10 is a sectional view taken along the line X-X in FIG. 9.

FIGS. 9 and 10 show the third embodiment of the present invention.

A belt body 2 is divided longitudinally to provide three detection areas A-C in which magnet sheet groups 3A-3C are embedded respectively. The number of the detection areas is optional.

The magnet sheet groups 3A-3C of the detection areas A-C are shifted stepwise along width and length of a conveyor belt to form an oblique arrangement over the whole width while magnetic pole is in the same direction. In FIG. 10, the magnet sheet group 3A of the detection area A is the shallowest and the magnet sheet group 3B and the magnet sheet group 3C become deeper in order.

Whenever the belt body 2 moves in a direction of P to make the detection areas A-C closer to the magnetic sensor 4, the magnetic sensor 34 detects magnetic force, and the magnetic sensor 4 outputs waveforms Ha-Hc which have substantially the same strength in the same detection area and become smaller in order of the detection areas A-C.

For example, local worn portion 15 occurs in the detection area A and a magnetic sheet M2 drops out, so that the second output waveform Ha2 in the detection area disappears. Similar to the second embodiment, it is detected by a site control portion 10 to allow where to wear and how deep to wear to be detected at the same time. As well as in the other detection areas B, C, if the belt is worn to the depth of the magnet sheet groups 3B,3C, local wear in the detection area B,C can be detected under the same principle.

FIGS. 11 and 12 show the fourth embodiment of the present invention.

In this embodiment, a belt body 2 comprises three layers of a reinforcement layer 2c such as cloth between a face layer 2a and a back layer 2b. A plurality of magnet sheets M1-M5 magnetized along thickness becomes deeper or shallower stepwise along length of the belt body 2 to form one unit U. A plurality of units U1-U5 are arranged to shift along length or width of the belt body 2.

N-poles of the magnet sheets M1-M5 are toward the face side of the belt body 2.

In front of the first unit U1 close to the reinforcement layer 2c in the face layer 2a, a magnet sheet MS for calculating the head and detecting elongation is embedded.

The magnetic pole of the magnet sheet MS is reverse to those of the other magnet sheets M1-M5 and S-pole is toward the face of the belt body 2. The others are the same as in the first embodiment.

In the fourth embodiment, when the belt body 2 moves in a direction of the arrow P in a normal condition, the magnet sheet MS outputs a single cycle output waveform Hx comprising a negative peak value and a positive peak value, and the magnet sheets M1-M5 of the first unit U1 output a single cycle output waveform comprising a positive peak value and a negative peak value. Then, each of the units U2-U5 outputs similar output waveforms HU2-HU3 repeatedly. HU4 and HU5 are not shown.

In the output waveform Hx, when the magnet sheet MS meets a loop-coil magnetic sensor 4 to allow a downward line of magnetic force toward the S-pole of the magnet sheet MS to go through a coil, the output waveform shows a negative peak value. When the magnet sheet MS leaves the magnetic sensor 4 to allow the line of magnetic force of the magnet sheet MS to go out of the coil, the output waveform shows a positive peak value.

In the output waveforms HU1-HU5, the magnet sheets M1-M5 of each of the units U1-U5 constitute one mass to form a distribution of the line of magnetic force. When the head of the mass of the magnet sheets M1-M5 passes by the loop-coil magnetic sensor 4 to allow an upward line of magnetic force from the N-pole of the magnet sheet M1-M5 to get into the coil, the output waveform shows a positive peak value. When the end of the mass of the magnet sheets M1-M5 leaves the magnetic sensor 4 to allow the line of magnetic force of the magnet sheets M1-M5 to get out of the coil, the output waveform shows a negative peak value.

The magnet sheets M1-M5 are embedded so that the sheets are embedded gradually deeper. Thus, the line of magnetic force passing through the magnetic sensor 4 is the strongest from the magnet sheet M1 and gradually decreases to allow the magnet sheet M5 to be the weakest. So the negative peak value at the end of each of the output waveforms HU1-HU5 is smaller than the positive peak value at the head.

In FIGS. 11 and 12, a local worn portion 16 in the belt body 2 occurs to allow the first magnet sheet M1 of the second unit U2 to drop out, so that the head peak value P1 of the second output waveform HU2 disappears as shown by a dotted line in FIG. 11. Similar to the first embodiment, change of peak distance and lowering of the peak value are detected by a site control portion 10 so that we can find a position and a degree of the wear of the local worn portion 16 exactly.

While the belt body 2 runs at a fixed velocity, time from the output waveform Hx to the next waveform Hx is measured. With extension of the time, elongation of the belt body 2 can be detected.

The foregoing merely relate to embodiments of the invention. Various changes and modifications may be made by a person skilled in the art without departing from the scope of claims.

For example, the magnet sheets M1-M6 need not to be arranged stepwise in FIGS. 2, 6 and 9, but may be arranged at random.

What is claimed is:

1. A conveyor-belt wear detector comprising:
   a belt body of a conveyor belt;
   a plurality of magnet sheets magnetized along a thickness of the belt body and embedded in the belt body at different depths longitudinally of the belt, each of said plurality of magnetic sheets comprising a bonded magnet in which magnet powder is dispersed, mixed in a rubber matrix and magnetized along the thickness of the belt body; and
   a magnetic sensor located close to the belt body to detect a change in magnetic force from said plurality of magnetic sheets in the belt body.

2. A detector of claim 1 wherein said plurality of magnetic sheets are embedded so that said plurality of magnetic sheets are gradually deeper longitudinally of the belt.

3. A detector of claim 1 wherein said plurality of magnetic sheets are embedded so that said plurality of magnetic sheets are gradually shallower longitudinally of the belt.

4. A detector of claim 1 wherein magnetic poles of said plurality of magnetic sheets are all directed in the same direction.

5. A conveyor-belt wear detector comprising:
   a belt body of a conveyor belt a plurality of magnet sheets magnetized along a thickness of the belt body and embedded in the belt body at different depths longitudinally of the belt;
   a magnetic sensor located close to the belt body to detect a change in magnetic force from said plurality of magnetic sheets in the belt body; and
   a control that counts the number of peak values of magnetic force of said plurality of magnetic sheets detected by the magnetic sensor, allowing dropout of the magnetic sheet to be detected digitally thereby detecting degree and a position of wear of the belt body.

6. A conveyor-belt wear detector comprising:
   a belt body of a conveyor belt;
   a plurality of magnet sheets magnetized along a thickness of the belt body and embedded in the belt body at different depths longitudinally of the belt;
   a magnetic sensor located close to the belt body to detect a change in magnetic force from said plurality of magnetic sheets in the belt body; and
   a control that detects degree of wear of the belt body analoguely depending on change in peak values of said plurality of magnetic sheets detected by the magnetic sensor.

* * * * *